April 25, 1961     F. M. RABUSE     2,981,355
AUTOMATIC CONTROL STEERING UNIT FOR TRACTORS
Filed Dec. 1, 1958     2 Sheets-Sheet 1
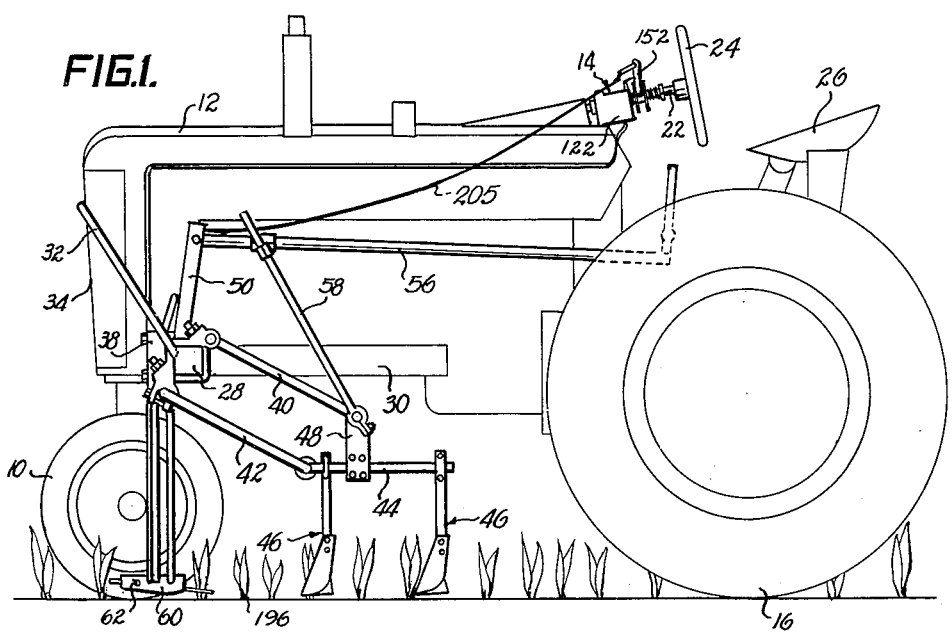
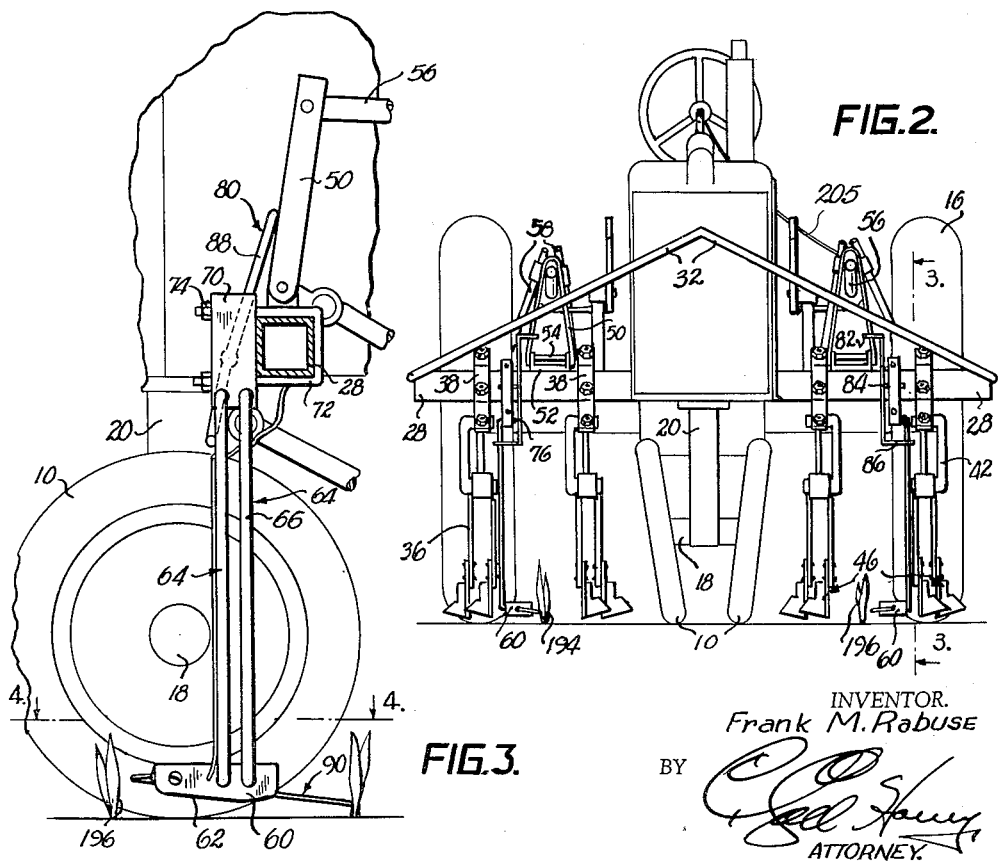
INVENTOR.
Frank M. Rabuse
BY
ATTORNEY.

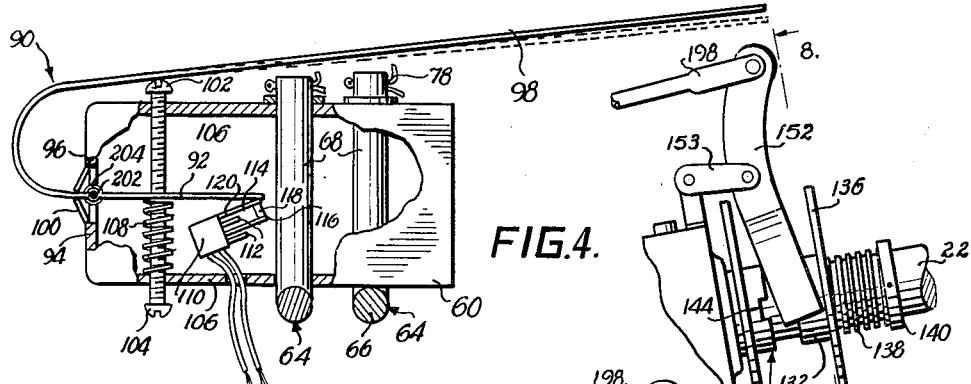
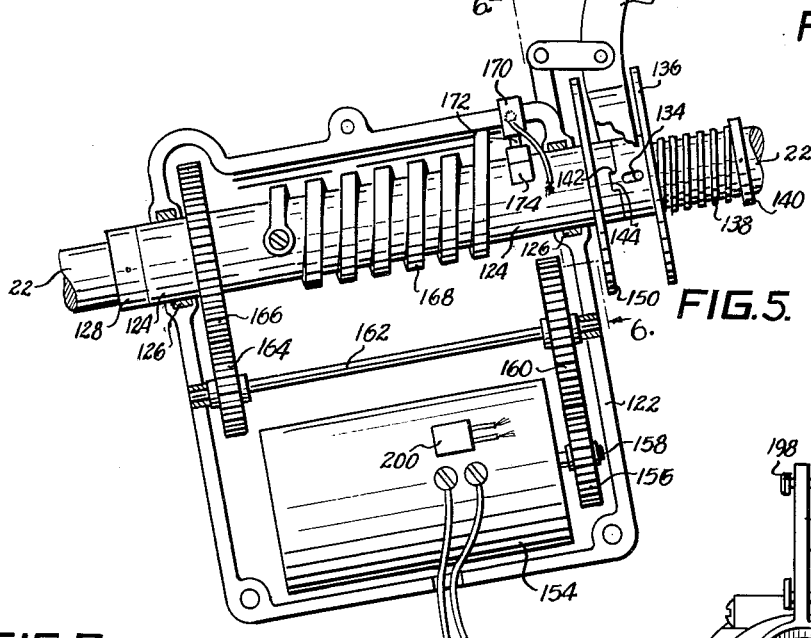
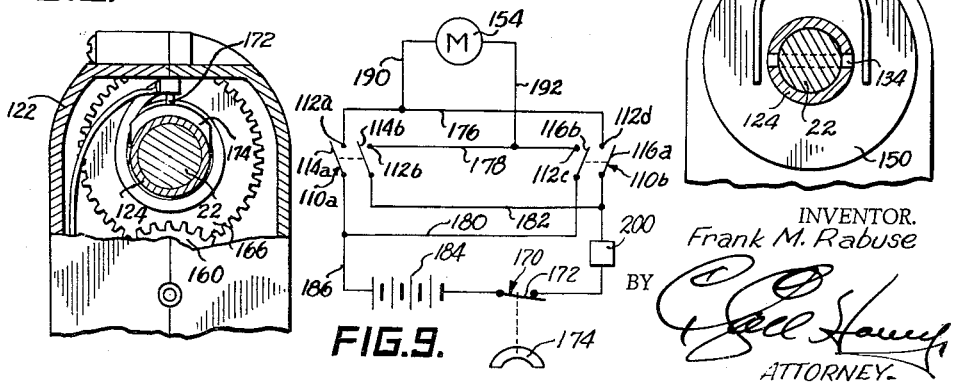

United States Patent Office 2,981,355
Patented Apr. 25, 1961

2,981,355
AUTOMATIC CONTROL STEERING UNIT FOR TRACTORS
Frank M. Rabuse, Hillsdale, Kans.
Filed Dec. 1, 1958, Ser. No. 777,295
10 Claims. (Cl. 180—79.1)

This invention relates to accessory equipment for tractors and has for its primary object to provide an assembly for automatically steering a tractor along a crop row, furrow ridge or similar defined line on the surface of the field without any attention from the tractor operator being required.

It is a particularly important object of the invention to provide a relatively simple and effective control assembly for automatically turning the steering column controlled front wheels of a tractor to guide the latter in parallel relationship to a row crop or furrow ridge which is sufficiently sensitive to maintain the cultivators or plow respectively of the tractor in parallel, relatively close relationship to the crop row or next adjacent furrow, as the case may be.

It is also an important object of the invention to provide automatic steering control mechanism for tractors of the type having a pair of relatively closely spaced front wheels movable between proximal crop rows during forward travel of the machine over the field, and the control assembly being designed to maintain the front wheels in substantially equidistant relationship to adjacent crop rows to thereby permit the cultivators to be disposed in proximity to the plants to be cultivated without danger of the cultivator blades digging up the plants because of erratic movement of the front wheels of the tractor.

Another object deemed to be of importance is the provision of a control assembly for automatically steering the front wheels of the tractor, having novel means adapted to be coupled with the steering column of the machine for yieldably maintaining the front wheels in a position with the axis of rotation thereof substantially perpendicular to the longitudinal length of the tractor whereby the latter normally moves along a relatively rectilinear path of travel until the mechanism forming the subject matter of the instant invention takes over and turns the front wheels in one direction or the other.

Also an important object of the invention is to provide a control assembly as defined having improved means permitting manual disconnection of the automatic control structure from the steering column of the tractor when desired.

Other important objects of the invention relate to the provision of a reversible motor operably coupled with the steering column of the tractor for rotating the same, as well as to a pair of structures adapted to be disposed on the tractor in positions permitting movable components thereon to engage respective crop rows when the front wheels of the machine move into closer proximity to an adjacent row of plants than the row on the other side of the wheels, and each of the components being disposed to engage and close a switch for actuating the motor in a direction to turn the front wheels away from the plants engaged by a respective component, whereby the front wheels are maintained in substantially equidistant relationship to the crop rows on each side thereof as the tractor advances over the field; to the provision of automatic steering structure for tractors which is particularly adapted for utilization with cultivator attachments and including improved means for swinging the units containing the movable components adapted to engage the plants, away from the surface of the field each time that the cultivators are lifted from the ground; to an automatic steering assembly for tractors as referred to above, which is especially adapted to be utilized in conjunction with a power steering unit on the tractor, whereby relatively inexpensive and low-power reversible power means may be employed to turn the steering column of the tractor in the required direction; to the provision of a control assembly which is adapted to be energized by the battery of the tractor, thereby precluding the necessity of providing an additional power source; and to other important objects and details of construction of the instant assembly which will become obvious or be described more fully as the following specification progresses.

In the drawings:

Figure 1 is a side elevational view of a tractor having cultivator attachments thereon and illustrating the relative positions and arrangement of parts of the automatic steering control unit constituting the subject matter of the invention;

Fig. 2 is a front elevational view of the tractor and associated components illustrated in Fig. 1;

Fig. 3 is an enlarged, fragmentary, vertical, cross-sectional view taken substantially on the line 3—3 of Fig. 2 and looking in the direction of the arrows;

Fig. 4 is a horizontal, cross-sectional view taken on the line 4—4 of Fig. 3, looking downwardly in the direction of the arrows and certain parts of the components being broken away and in section to reveal details of construction thereunder;

Fig. 5 is a vertical, fragmentary, enlarged, cross-sectional view through the control unit adapted to be operably coupled with the steering column of the tractor;

Fig. 6 is a vertical, cross-sectional view taken substantially on the line 6—6 of Fig. 5;

Fig. 7 is an enlarged, fragmentary view of the unit shown in Fig. 5 and illustrating the normally open position of the clutch components thereof;

Fig. 8 is a vertical, cross-sectional view taken on the line 8—8 of Fig. 7; and

Fig. 9 is a schematic representation of the wiring of certain of the components of the instant assembly.

An assembly for automatically turning the steering column controlled front wheels 10 of a tractor 12 to guide the latter as the same advances, is broadly designated by the numeral 14 and shown in the drawings in its preferred form. Tractor 12 is conventional in that the same has relatively large, widely spaced rear traction wheels 16 while wheels 10 preferably are of the type mounted on horizontal axle structure 18 rotatable about a vertical support column 20 which turns in response to rotation of steering column 22 having a steering wheel 24 on the uppermost end thereof adjacent the operator's seat 26 between rear wheels 16. Front wheels 10 are disposed in relatively close relationship and cambered so that the lower parts thereof are in closer proximity than the upper portions thereof. Although not illustrated in the drawing, it is to be understood that tractor 12 is provided with a conventional power steering unit interposed in the connection between steering column 22 and column 20 for turning front wheels 10, whereby relatively little power is required to effect rotation of column 22.

Although assembly 14 is adapted to be utilized on tractor 12 in conjunction with various types of accessory implements, for purposes of illustration only, a cultivator attachment is shown in place on tractor 12 in the accompanying drawings. Cultivator attachment is conventional in that the same includes a pair of aligned, oppositely extending, parallel, transversely rectangular mounting bars 28 projecting laterally from the frame 30 of tractor 12 adjacent front wheels 10 thereof. Various braces such as 32 are provided for assuring rigidity of mounting bars 28 and which may interconnect the outermost ends of the latter with the forward radiator grill section 34 of tractor 12.

A number of cultivator assemblies 36 are mounted on each of the bars 28 and include a bracket 38 removably secured to a respective bar 28 in horizontally spaced relationship to frame 30, and swingably mounting a pair of parallel, elongated rods 40 and 42 of substantially equal length. A normally horizontally disposed bar 44 swingably secured to the outer end of rod 42 away from a respective bar 28 mounts a pair of cultivator units 46 disposed in tandem, while upright bracket 48 secured to bar 44 intermediate cultivator units 46 is pivotally connected to the outermost proximal end of a corresponding rod 40.

Although any number of cultivator assemblies 36 may be mounted on respective bars 28, depending upon the longitudinal length thereof, it is conventional to provide at least two such assemblies on each bar 28, and means for lifting each of the bars 44 and thereby associated cultivator units 46 out of engagement with the ground includes a substantially V-shaped member 50 pivotally mounted on each of the bars 28 by a U-shaped bracket 52 provided with a pin 54 extending transversely through upright legs of bracket 52 and downwardly projecting extremities of corresponding members 50. A connecting rod 56 pivotally joined to the uppermost converging portion of each member 50 and extending rearwardly along a corresponding side of tractor 12 in longitudinal alignment therewith is connected to the hydraulic mechanism of tractor 12 adjacent wheels 16 in a manner to swing respective members 50 about pins 54 as connecting rods 56 are reciprocated by the hydraulic unit. Tie rods 58 secured to each assembly 36 at the point of connection of respective rods 40 with brackets 48, are also pivotally joined adjacent their uppermost ends to corresponding connecting rods 56 in a manner to cause bars 44 to move upwardly in response to forward movement of connecting rods 56.

Automatic steering assembly 14 includes a pair of substantially identical, hollow boxes 60 each suspended from a respective mounting bar 28 and provided with an arcuate lower surface 62 to prevent boxes 60 from hanging up on irregularities in the surface of the field or other obstructions, such as weeds, encountered as tractor 12 moves forwardly. Structure for suspending each box 60 from a respective mounting bar 28 includes a pair of identical, substantially U-shaped rods 64, each having an elongated bight portion 66 and relatively short, parallel, laterally extending legs 68 at opposite ends thereof, legs 68 of each pair of rods 64 being pivotally received within the lower extremity of a rectangular mounting block 70 secured to a respective mounting bar 28 by a U-bolt 72 clamped around a corresponding mounting bar 28 and held in position thereon by nuts 74. Removable fasteners 76 extending transversely through the outer ends of each leg 68 of rods 64 releasably maintain the latter in suspended relationship to blocks 70. The lowermost, laterally extending legs 68 of each pair of rods 64 extend transversely through a corresponding box 60, as best shown in Fig. 4, while fasteners 78 removably extending through the outer ends of each of the lower legs 68 releasably maintain boxes 60 suspended from respective pairs of rods 64. Lower legs 68 of each pair of rods 64 are preferably spaced equally with respect to the upper legs 68 of the defined pair of rods 64, whereby bight portions 66 are maintained in parallel relationship and box 60 is substantially horizontal when positioned directly beneath a corresponding mounting bar 28.

Means for swinging boxes 60 vertically relative to the ground in response to lifting of cultivator units 46 as connecting rods 54 are reciprocated, includes a substantially Z-shaped rod 80 pivotally secured to each of the blocks 70 and thereby having three parallel legs 82, 84 and 86 interconnected by a cross portion 88, it being seen that intermediate leg 84 extends through a respective block 70 and is rotatable therein, while each of the upper legs 82 is disposed to engage a corresponding V-shaped member 50 and lower legs 86 are located in engagement with adjacent respective bights 66 of one of the rods 64. Cross portions 88 of each of the rods 80 are longitudinally bent to thereby cause legs 82 and 86 to engage cross members 50 and rods 64 respectively.

Boxes 60, suspended from mounting bars 28, each have a substantially U-shaped component or feeler 90 movably mounted thereon and having a relatively short leg 92 extending inwardly into the interior of each box 60 through the forward vertical wall 94 provided with a central aperture 96 receiving a respective leg 92, while the other leg 98 of each feeler 90 is substantially longer than a corresponding leg 92 and extends rearwardly from box 60 a substantial distance, as shown most clearly in Fig. 4. It is to be noted that leg 98 is not parallel with leg 92 and is in greater spaced relationship to box 60 as the outermost end thereof is approached. An annular member 100 of flexible, preferably synthetic resin material is secured to each box 60 within aperture 96 thereof and receives respective legs 92 of feelers 90 for preventing dust and the like from entering the interior of each box through the defined apertures 96.

Feelers 90 are each provided with a member 202 extending laterally above and below the major plane of respective feelers 90 with opposed ends of members 202 being rotatably carried by corresponding bearings 204 mounted on boxes 60. Bearing 204 maintains members 202 in vertical positions and thereby cause feelers 90 to be swingable within parallel horizontal planes. Means for limiting the extent of movement of legs 92 within each box 60 comprises a pair of opposed, aligned screws 102 and 104 complementally threaded into opposed side walls 106 of each box 60 and located with leg 92 of each feeler 90 disposed between adjacent extremities of screws 104. A coil spring 108 surrounding screw 104 within a respective box 60 engages a proximal wall 106 and leg 92 to thereby bias the latter into engagement with the opposed extremity of screw 102.

For reasons to be clearer hereinafter, a single throw, double pole switch 110 is provided within each of the boxes 60 and includes a pair of spaced contacts 112 adapted to be engaged by a pair of movable switch arms 114 and 116 connected by an insulator 118, with arm 114 having an outer insulator 120 thereon disposed to be engaged by a respective leg 92 during movement of feeler 90 in a direction to cause arms 114 and 116 to engage respective contacts 112. Electrical leads, to be described in regard to the schematic illustration shown in Fig. 9, are connected to switch 110 and pass through a proximal side wall 106 of box 60.

Mechanism for rotating steering column 22 in response to closing of switches 110 includes a sectional housing 122 adapted to be secured to tractor 12 adjacent steering wheel 24, as indicated in Fig. 1, and located in surrounding relationship to a portion of steering column 22. An elongated sleeve 124 telescoped over column 22 is rotatably carried by opposed, aligned bearings 126 in housing 122 and is maintained in predetermined position on column 22 by a set collar 128 located externally of housing 122 in proximity to the dash of tractor 12 while clutch means broadly numerated 130 prevents reciprocation of sleeve 124 in a direction toward steering wheel 24.

Clutch means 130 includes a tubular member 132 secured to column 22 for rotation therewith by a pin 134 extending transversely through member 132 and column 22 and slidable within a slot in member 132 the latter thereby being reciprocable relative to housing 122, sleeve 124 and column 22 along a limited path of travel. A relatively large diameter flange 136 integral with the peripheral extremity of member 132 away from housing 122 is engaged by a coil spring 138 surrounding column 22 and engaging a set collar 140 secured to column 22 in spaced relationship to flange 136. The peripheral margin of member 132 remote from flange 136 has a pair of opposed, outwardly extending lugs 142 adapted to be received within complemental notches 144 in the adjacent extremity of sleeve 124. Means for shifting member 132 relative to sleeve 124 includes Y-shaped yoke 146 having a U-shaped section 148 disposed between a flange 150 integral with sleeve 124 and flange 136, it being noted that flange 150 is located in proximity to flange 136 on the opposite side of lugs 142. The leg segment 152 of yoke 146 is pivotally secured to housing 122 by a pair of parallel bracket arms 153. The legs of U-section 148 are of sufficient width to substantially span the distance between proximal flanges 136 and 150 whereby, upon pivoting of yoke 146 about the axis of interconnection thereof with bracket arms 153, flanges 136 and 150 are spread relatively to move lugs 142 out of complemental notches 144.

A reversible electric motor 154 mounted within housing 122 beneath column 22 has a relatively small spur gear 156 on the drive shaft 158 thereof and operably meshing with a larger spur gear 160 secured to a shaft 162 rotatably carried within housing 122 between motor 154 and sleeve 124. A third, relatively small spur gear 164 secured to shaft 162 in opposition to spur gear 160, operably meshes with a larger spur gear 166 in turn surrounding and secured to sleeve 124 adjacent the inner wall of housing 122. It is to be pointed out that spur gears 156, 160, 164 and 166 are of suitable diameters to greatly reduce the rate of rotation of sleeve 124 relative to the rate of drive shaft 158 during actuation of motor 154.

A relatively strong coil spring 168 surrounding sleeve 124 is secured at one end thereof to housing 122 and at the opposite end thereof to sleeve 124, it being pointed out that spring 168 is connected to sleeve 124 in a manner to maintain the wheels 10 in a straightforward position and thereby serving to cause tractor 12 to travel a substantially rectilinear path of travel in the absence of actuation of motor 154, as will be clearer hereinafter.

A normally open switch 170 carried by housing 122 has a switch arm 172 disposed to be engaged by a crescent-shaped cam 174 secured to the outer cylindrical surface of sleeve 124, cam 174 being disposed to maintain arm 172 in its substantially innermost position during the time that column 22 is disposed to cause front wheels 10 to be located with the axis of rotation thereof substantially perpendicular to the longitudinal length of tractor 12. It is to be preferred that the outermost arcuate surface of cam 174 be equal to approximately one-fourth the distance around the axis of column 22 at a radius equal to the distance between the axis of column 22 and the defined arcuate surface of cam 174.

The electrical circuit for steering assembly 14, as indicated schematically in Fig. 9, includes a pair of single throw, double pole switches 110a and 110b, switch 110a being disposed in one of the boxes while the switch 110b is disposed in the other box 60. Contact 112a of switch 110a is connected to contact 112d of switch 110b by a lead 176, while contact 112b of switch 110a is electrically connected to contact 112c of switch 110b by a lead 178. Switch arm 114a of switch 110a is electrically connected to switch arm 116b of switch 110b by a conduit 180, while another conduit 182 electrically connects switch arm 114b of switch 110a with switch arm 116a of switch 110b. The battery 184 conventionally provided on tractor 12 is interposed in a lead line 186 connected to conduits 180 and 182 respectively, with switch 170 also disposed in lead line 186 for breaking the flow of current from battery 184 to switches 110a and 110b.

Reversible motor 154 is connected to lead 176 by a line 190 and to lead 178 by a line 192. Thermostatic delay relay 200 interposed in lead line 186 is adapted to be opened whenever the voltage through such line exceeds a predetermined value as would occur if both the switches 112 should be closed at the same time.

In order to illustrate the operation of control assembly 14, tractor 12 has been illustrated in association with a pair of substantially parallel, rectilinear rows 194 and 196 of plants such as corn or the like, with the normal position of tractor 12 relative to rows 194 and 196 during advancement thereof over the field being shown in Fig. 2 with wheels 10 disposed between rows 194 and 196 while rear wheels 16 are located outboard from respective rows of plants. Assuming that it is desired to cultivate the plants in rows 194 and 196 as well as other rows located outwardly from the defined lines of plants, and without guiding of tractor 12 by the operator being required, upon actuation of the hydraulic mechanism of the tractor 12 to shift connecting rods 56 rearwardly and thereby pivot members 50 in a direction to move cultivators 46 into engagement with the ground, the tension on yoke 146 effected by line 205 interconnecting one of the connecting rods 56 with coupler 198 pivotally joined to arm segment 52 of yoke 146, is released and spring 138 biases member 132 into engagement with sleeve 124 with legs 142 disposed in complemental notches 144. Upon interconnection of sleeve 124 with member 132, coil spring 168 yieldably maintains column 22 in a position causing front wheels 10 to be disposed with the axis of rotation thereof in substantially perpendicular relationship to the longitudinal length of tractor 12, and thereby effecting a substantially rectilinear path of travel of the machine as the same moves forwardly with respect to rows 194 and 196, tractor 12 continues to move forwardly, but if one of the boxes 60 is moved into sufficiently proximal relationship to the plants in an adjacent row 194 or 196 to cause a respective leg 98 of a feeler 90 to engage the plants, such feeler 90 is moved relative to respective box 60 and causing leg 92 thereof to engage a corresponding arm 114 of a switch 110 and swinging the same in a direction to effect closing of the circuit by virtue of contacting proximal contacts 112. Assuming that arms 114a and 114b of switch 110 are closed by a respective feeler 90 and thereby moved into contacting relationship with contacts 112a and 112b, it can be seen that motor 154 is actuated through a circuit traced from battery 184 by lead line 186, conduit 180, lead 176 and line 190 connected to motor 154, while the return circuit includes line 192, lead 178, conduit 182 and lead line 186 having switch 170 interposed therein. Under these circumstances, spur gear 156 on drive shaft 158 is rotated in a direction to turn sleeve 124 through spur gears 160, 164 and 166 in a direction to rotate column 22, thereby effecting turning of wheels 10 away from a row 194 contacted by a respective feeler 90.

If tractor 12 moves toward the opposite row, for example 196, the proximal feeler 90 engages the plants of row 196 to thereby effect movement of leg 92 of the same and causing switch arms 116a and 116b to be swung into contacting relationship with corresponding contacts 112c and 112d to thereby effect rotation of motor 154 in the opposite direction through a circuit traced by lead line 186, conduit 180, switch arm 116b, lead 178 and line 192 to motor 154, while the return circuit includes line 190, lead 176, switch arm 116a and lead line 186 back to battery 184. It can be recognized that upon disengagement of leg 98 of feeler 90 proximal to row 196, arms 116a and 116b move out of contacting relationship with respective contacts 112c and 112d, whereby operation of motor 154 is discontinued.

It can now be perceived that front wheels 10 of tractor 12 are guided between rows 194 and 196 during forward movement of the machine, and boxes 60 and their associated components maintain wheels 10 in substantially equidistant relationship to the plants in rows 194 and 196 and thereby prevent cultivator units 46 from digging up the plants in the corresponding rows.

Cam 174 is provided for disconnecting motor 154 from battery 184 at any time that sleeve 124 is rotated more than a quarter turn for any reason whatsoever. Upon movement of cam 174 to a position permitting arm 172 to move to the outermost end of its path of travel, the circuit to motor 154 is broken and thereby permitting spring 168 to again straighten front wheels 10.

In the preferred arrangement of assembly 14 on tractor 12, lever or arm 198 is operably coupled with connecting rods 56 by line 205 so that upon reciprocation of the same forwardly to swing cultivator units 46 upwardly with respect to the ground, yoke 146 is pivoted in a direction to separate member 132 from the proximal end of sleeve 124 and thereby disconnecting the automatic steering assembly 14 from column 22. Furthermore by swinging yoke 146 forwardly as far as the latter is permitted to move yoke 146 is not affected by movement of rods 56 and automatic steering unit 14 is maintained out of operable engagement with shaft 22.

It can also be appreciated that as cultivator units 46 are lifted from the ground during reciprocation of connecting rod 56, in turn secured to tie rods 58 pivotally joined to respective brackets 48 on bars 44, Z-shaped rods 80 swing boxes 60 relative to corresponding blocks 70 to positions spaced vertically above the surface of the ground.

Steering assembly 14 may be utilized with equal facility for steering tractor 12 along a line defined by the ridges of furrows or the like produced by listing operations and similarly, by slight modification of boxes 60, an assembly 14 may be provided on tractor 12 for guiding the same during plowing operations.

For plowing purposes, one of the boxes 60 is moved to the side of tractor 12 adjacent the other box 60 and with the feeler 90 thereof facing outwardly in an opposite direction from the feeler 90 on the box 60 which has not been moved. In this arrangement feelers 90 engage opposed faces of the dead furrow during plowing thereby automatically maintaining the tractor in alignment with the dead furrow. In the event such dead furrow is relatively narrow, boxes 60 may be placed in tandem if desired.

It is apparent that other similar modifications may be made in the instant invention without departing from the spirit thereof and it is therefore intended to be limited only by the scope of the appended claims.

Having thus described the invention what is claimed as new and desired to be secured by Letters Patent is:

1. An assembly for automatically turning the steering column controlled front wheels of a tractor to guide the latter in a field having means on the terrain thereof defining a pair of spaced, substantially parallel lines between which the front wheels are to move as the tractor travels over the ground, said assembly comprising a pair of units adapted to be secured to the tractor in horizontally spaced relationship and at substantially the same height relative to the ground; feeler means pivotally mounted on each of the units for movement relative to the latter, each of said feeler means including a first portion extending into a corresponding unit, and a second outer portion disposed to engage respective line defining means on the ground, said second portions of the feeler means normally being spaced apart a distance somewhat less than that between said lines whereby the feeler means are alternately engageable with respective adjacent line defining means for indicating when the front wheels are in closer proximity to a corresponding adjacent line defining means than to the other line defining means; power operated means adapted to be operably connected to said steering column of the tractor for rotating the same in opposite directions; and means for controlling operation of said power operated means including structure within each of said units and actuatable by said first portions of the feeler means for activating said power operated means to rotate the steering column in one direction when a corresponding second portion of a respective feeler means engages an adjacent line defining means on the ground to effect pivoting of the respective feeler means relative to the tractor whereby the front wheels of the tractor are maintained substantially equidistant from said opposed line defining means as the tractor travels over the field.

2. An assembly for automatically turning the steering column controlled front wheels of a tractor to guide the latter in a field having means on the terrian thereof defining a pair of spaced, substantially parallel lines between which the front wheels are to move as the tractor travels over the ground, said assembly comprising a pair of units adapted to be secured to the tractor in horizontally spaced relationship and at substantially the same height relative to the ground; feeler means pivotally mounted on each of the units for movement relative to the latter, each of said feeler means including a first portion extending into a corresponding unit, and a second outer portion disposed to engage respective line defining means on the ground, said second portions of the feeler means normally being spaced apart a distance somewhat less than that between said lines whereby the feeler means are alternately engageable with respective adjacent line defining means for indicating when the front wheels are in closer proximity to a corresponding adjacent line defining means than to the other line defining means; oppositely rotatable power means adapted to be coupled with said steering column for rotating the latter; and control means actuated by said first portions of respective feeler means for activating said rotatable power means whenever the second portion of a corresponding feeler means engages a proximal line defining means on the field whereby the front wheels of the tractor are turned away from said line defining means upon engagement of corresponding feeler means therewith to thereby maintain the axis of rotation of the front wheels of the tractor in substantially perpendicular relationship to said line defining means as the tractor travels over the field.

3. An assembly as set forth in claim 2 wherein is included a power circuit and said oppositely rotatable power means comprises a reversible electric motor connected to said circuit, said control means on each of the units including switch means interposed in said circuit and disposed to be closed upon swinging movement of a respective feeler means to thereby close the circuit to said motor and actuate the latter in a direction to turn the wheels away from the line defining means engaged by a corresponding feeler means.

4. An assembly as set forth in claim 2 wherein is provided coil spring means adapted to be positioned in surrounding relationship to said steering column and including means for securing opposite ends of the spring means to the steering column and the frame of the tractor respectively for yieldably maintaining the steering column in a position with the axis of rotation of the front wheels in substantially perpendicular relationship to the longitudinal length of the tractor.

5. An assembly as set forth in claim 2 wherein is provided manually controlled clutch means adapted for coupling said power means to the steering column.

6. An assembly as set forth in claim 2 wherein is provided parts adapted for swingably mounting each of the units on the tractor in positions permitting the units to be swung through vertically disposed arcs to locations spaced above the surface of the field.

7. An assembly as set forth in claim 6 adapted to be mounted on a tractor provided with cultivator attachments and wherein is provided means carried by the attachments and engageable with said units for swinging the latter vertically away from the surface of the field upon lifting of the cultivators.

8. An assembly for automatically turning the steering column controlled front wheels of a tractor to guide the latter in a field having means on the terrain thereof defining a pair of spaced, substantially parallel lines between which the front wheels are to move as the tractor travels over the ground, said assembly comprising oppositely rotatable power means adapted to be coupled with said steering column for rotating the latter; a pair of structures including movable components, said structures being adapted to be mounted on the tractor in disposition independent of movement of the front wheels and in positions permitting the component of each structure to engage a respective adjacent line defining means when the front wheels are in closer proximity to said adjacent line defining means than the other remote line defining means; a power circuit; a reversible electric motor connected to said circuit; and control means on each of the structures including switch means interposed in said circuit, each of said components including a substantially U-shaped member provided with a pair of legs, one of the legs being movably positioned within a respective structure and disposed to engage a corresponding switch means and to close the latter upon movement of a corresponding component to thereby close the circuit to said motor and actuate the latter in a direction to turn the front wheels of the tractor away from the line defining means engaged by a corresponding component, the other leg of each of said components being substantially longer than said one leg and extending rearwardly from a corresponding structure in substantial parallelism with the ground and in a position to engage a respective line defining means.

9. An assembly for automatically turning the steering column controlled front wheels of a tractor to guide the latter in a field having means on the terrain thereof defining a pair of spaced, substantially parallel lines between which the front wheels are to move as the tractor travels over the ground, said assembly comprising oppositely rotatable power means adapted to be coupled with said steering column for rotating the latter; a pair of structures including movable components, said structures being adapted to be mounted on the tractor in disposition independent of movement of the front wheels and in positions permitting the component of each structure to engage a respective adjacent line defining means when the front wheels are in closer proximity to said adjacent line defining means than the other remote line defining means; a power circuit; a reversible electric motor connected to said circuit; control means on each of the structures including switch means interposed in said circuit and disposed to be closed upon movement of a respective component to thereby close the circuit to said motor and actuate the latter in one direction to turn the wheels away from the line defining means engaged by a corresponding component; a normally open switch in said circuit; and means for maintaining said normally open switch in a closed condition until said steering column has been rotated in either direction through a predetermined arc.

10. An assembly as set forth in claim 9 wherein said switch includes a switch arm biased toward an open position breaking the circuit and wherein is included a cam adapted to be mounted on the column in a position to engage and normally maintain the switch arm in said closed position thereof closing the circuit.

References Cited in the file of this patent

UNITED STATES PATENTS

| | | |
|---|---|---|
| 1,320,557 | Koepke | Nov. 4, 1919 |
| 1,620,099 | Hover | Mar. 8, 1927 |
| 1,682,228 | Jones | Aug. 28, 1928 |
| 1,868,360 | Knight | July 19, 1932 |
| 2,021,706 | Twyman | Nov. 19, 1935 |
| 2,496,727 | Jenkins | Feb. 7, 1950 |